United States Patent [19]

El-Hamamsy et al.

[11] Patent Number: 5,030,889
[45] Date of Patent: Jul. 9, 1991

[54] LAMP BALLAST CONFIGURATION

[75] Inventors: Sayed-Amr A. El-Hamamsy; Robert J. Thomas; Joseph C. Borowiec, all of Schenectady, N.Y.

[73] Assignee: General Electric Company, Schenectady, N.Y.

[21] Appl. No.: 454,549

[22] Filed: Dec. 21, 1989

[51] Int. Cl.$^5$ ............................................. H05B 41/00
[52] U.S. Cl. ............................. 315/200 R; 315/276; 361/386
[58] Field of Search ................. 315/200 R, 219, 220, 315/248, 276, 277; 361/386, 388, 412, 415

[56] References Cited

U.S. PATENT DOCUMENTS

| | | | |
|---|---|---|---|
| 3,500,118 | 3/1970 | Anderson | 315/248 |
| 4,180,763 | 12/1979 | Anderson | 315/248 |
| 4,910,439 | 3/1990 | El-Hamamsy et al. | 315/248 |

Primary Examiner—David Mis
Attorney, Agent, or Firm—Jill M. Breedlove; James C. Davis, Jr.; Marvin Snyder

[57] ABSTRACT

A lamp ballast configuration in which input power is conducted by one circuit board to the switching devices of a half bridge circuit whose output is conducted on a second circuit board with the two circuit boards mounted parallel and spaced apart disposes the device package which extends between the two circuit boards in an exposed position for direct contact to a heat sink. Drive transformers for the switching devices are preferably mounted between the circuit boards and shielded on four of their six sides by a combination of ground planes on the circuit boards and wide, flat ground conductors connecting the ground planes of the two circuit boards. A compact, high efficiency (>91%) RF system is obtained which is suitable for excitation of an electrodeless, high-intensity-discharge lamp.

14 Claims, 7 Drawing Sheets

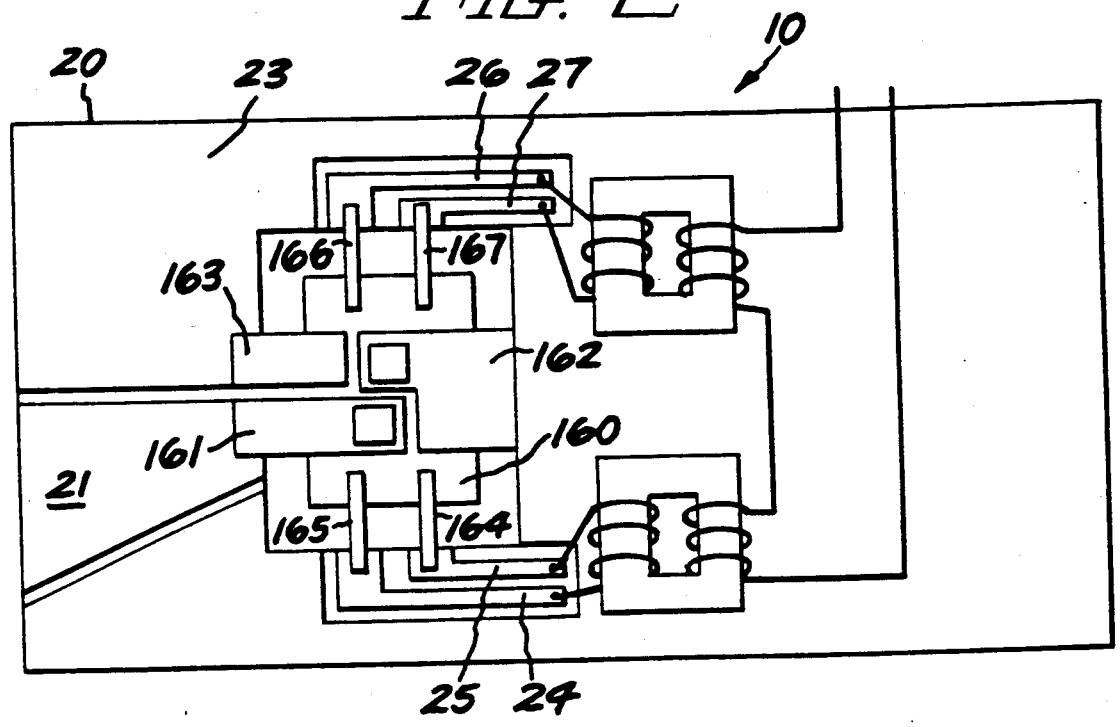
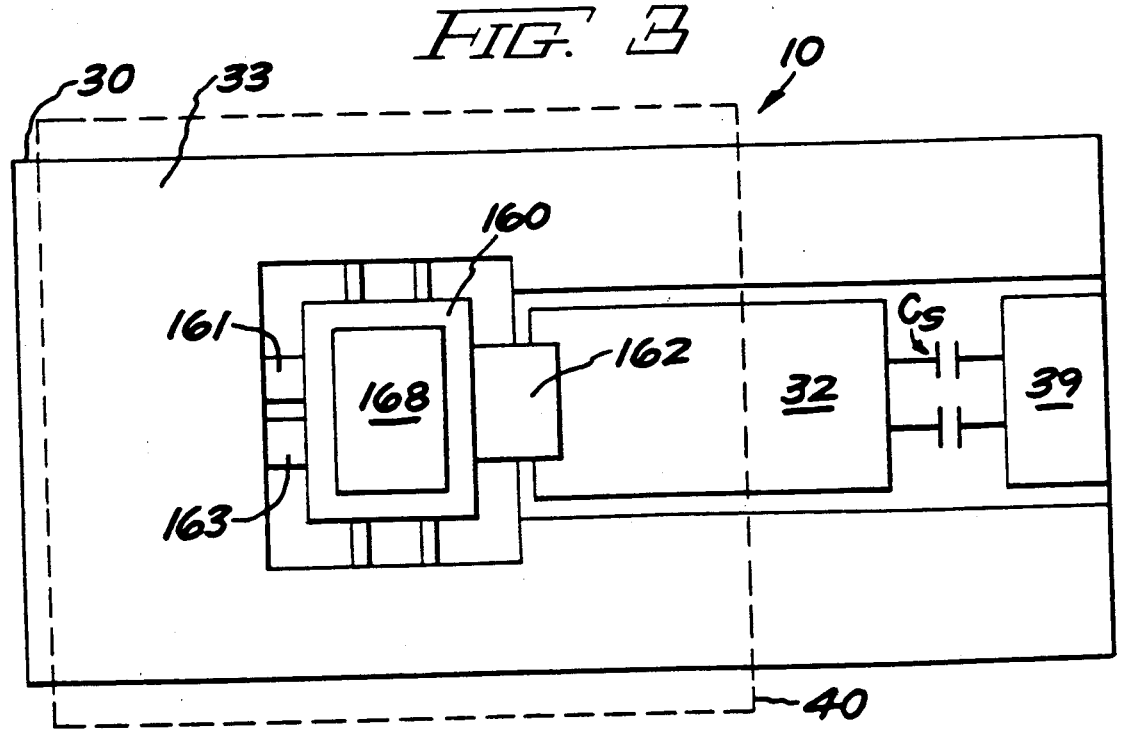

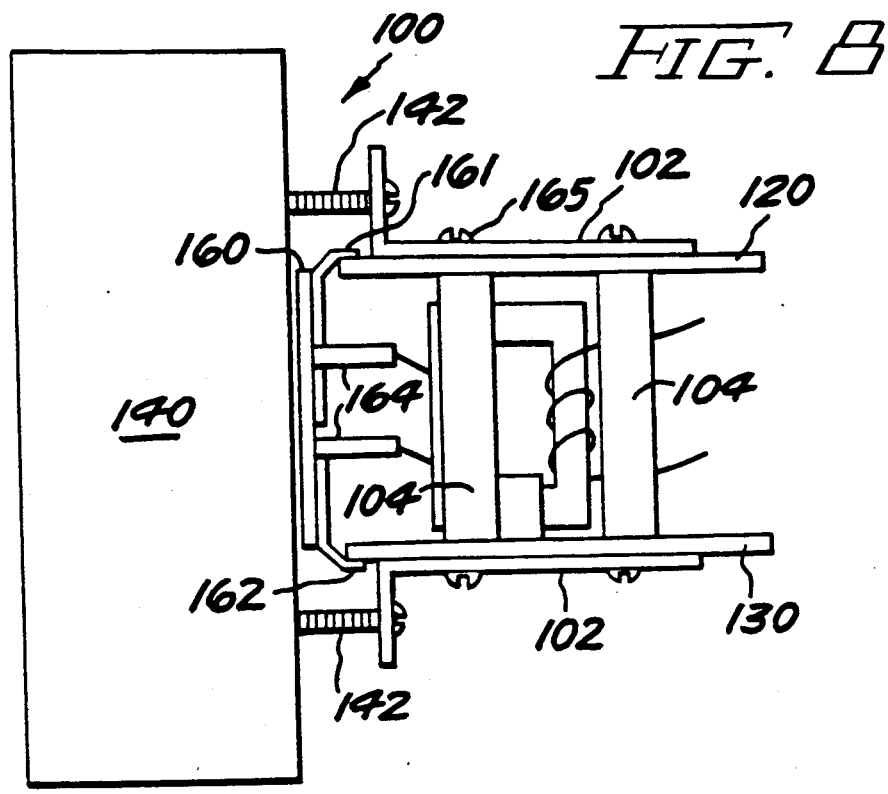
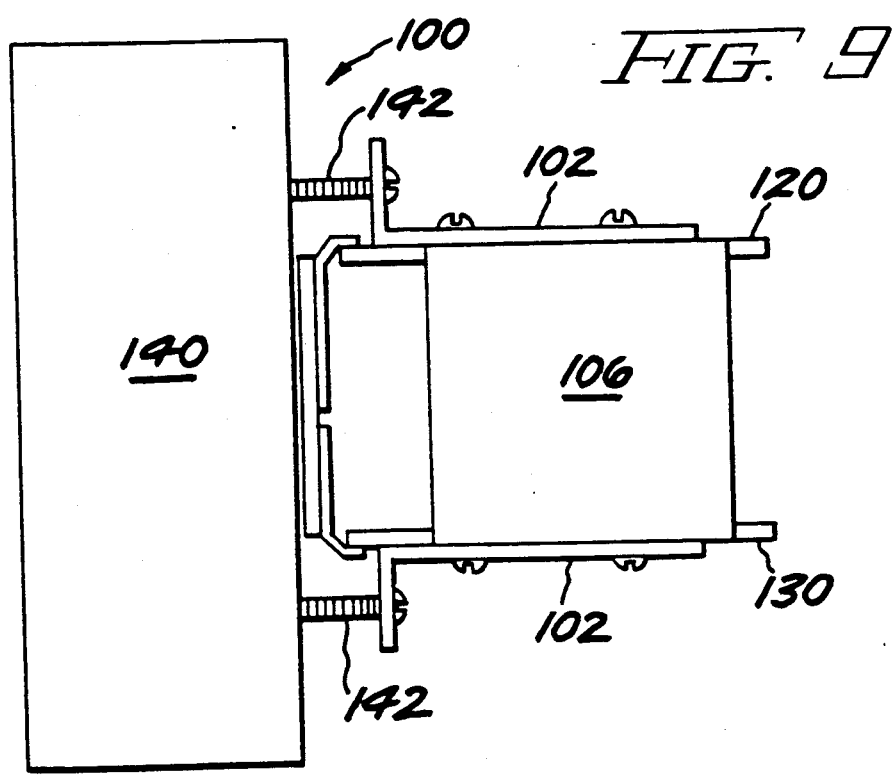

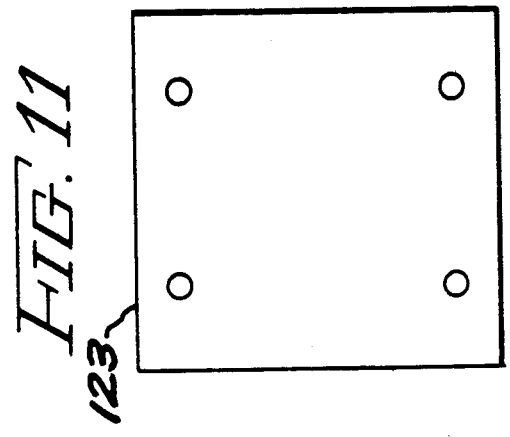
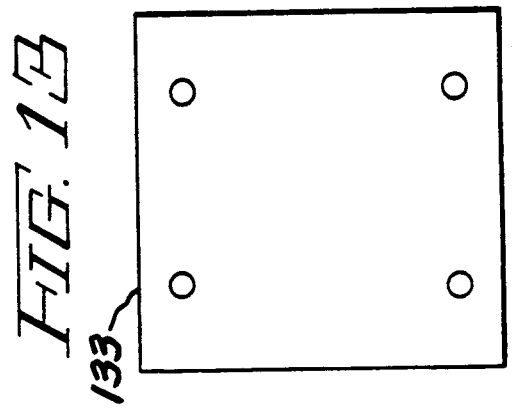
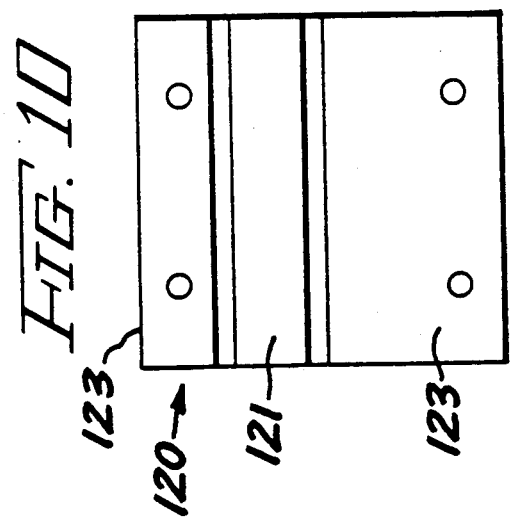
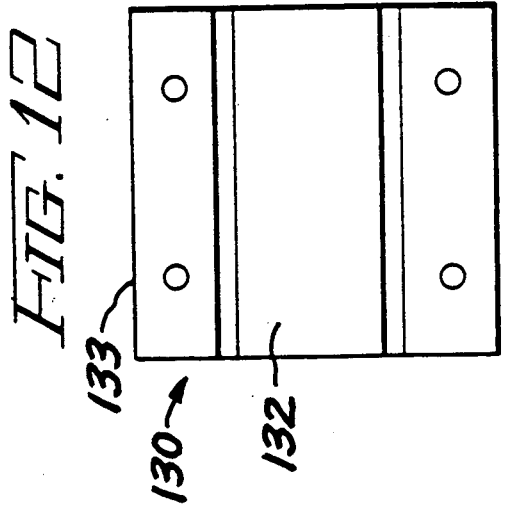

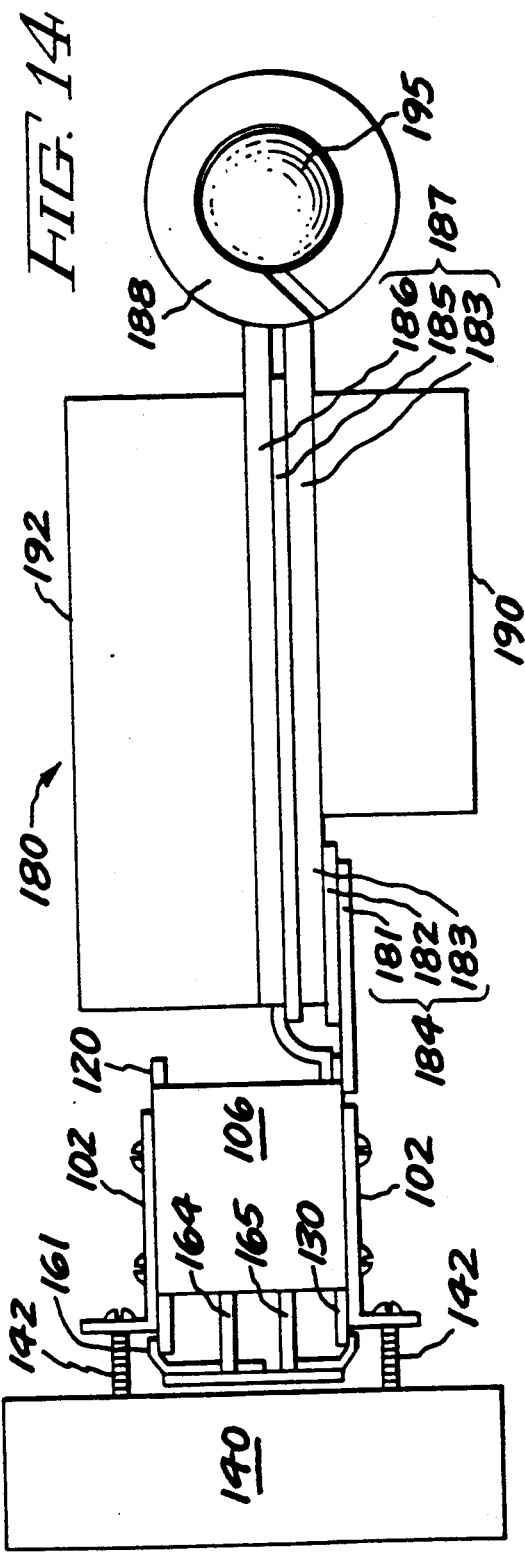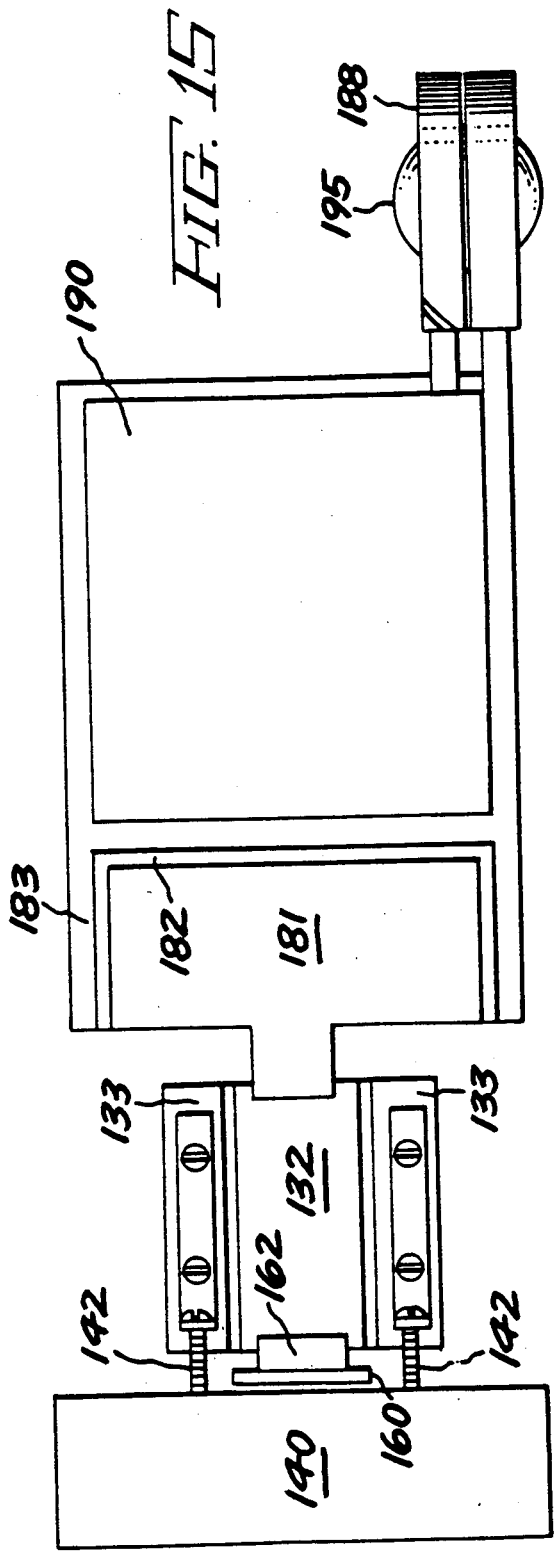

LAMP BALLAST CONFIGURATION

RELATED APPLICATIONS

This application is related to application Ser. No. 454,614, entitled "Driver For a High Efficiency, High Frequency Class-D Power Amplifier" by Sayed-Amr El-Hamamsy et al. and patent application Ser. No. 454,550, entitled "Half Bridge Device Package, Packaged Devices and Circuits" by Sayed-Amr El-Hamamsy, et al., both of which are filed concurrently herewith. Each of these patent applications is incorporated herein by reference, in its entirety.

BACKGROUND OF THE INVENTION

1. Field of the Invention

The present invention relates to lamp ballasts and, more particularly, to lamp ballasts which are suitable for exciting electrodeless, high-intensity-discharge lamps.

2. Background Information

In the lighting field, it has long been desired to provide long lifetime, low maintenance, low life cycle cost lighting systems. One of the lamp life limiting factors which increases the life cycle cost of common incandescent lights and fluorescent lights is their dependence on the filament in the case of the incandescent light, and on electrodes in the case of the fluorescent light for establishing and maintaining the light output. While the periodic replacement of such lamps in a domestic setting is an inconvenience, the only direct cost of replacing such lamps is normally the cost of the replacement bulb. In contrast in commercial settings, the labor cost for replacing a spent bulb often approaches or exceeds the cost of the replacement bulb, even in easily accessible fixtures. In hard to reach locations, such as high ceilings, light stanchions in parking lots and other relatively inaccessible locations where mechanical lifting equipment is required in order to reach the fixture to replace the spent bulb, the cost of replacing a bulb normally vastly exceeds the cost of the bulb itself.

Another major concern in commercial lighting is power efficiency because many commercial establishments contain hundreds, thousands or even tens of thousands of lamps with the result that even a small change in the power efficiency of a lighting system can result in substantial power and cost savings. In addition, if a particularly high efficiency lighting system generates more light than corresponding lower efficiency systems, the number of lamps required to light large areas may be reduced, thereby saving the initial capital cost of the omitted fixtures, along with their wiring and installation costs in addition to their ongoing operating costs.

An overall power efficiency measure of a lamp system is the quantity of light output (which may be measured in lumens) which is provided per watt of electrical power input. The power loss in a lighting system may be divided into two separate components. The first power loss component is the portion of the power consumed by the lamp fixture as a whole which is not actually delivered to the light production medium, whether that be the filament of an incandescent lamp, the arc of a fluorescent lamp or the ionizable, arc-producing gas of a gas discharge lamp. Power losses which help to prevent 100% efficiency in the transmission of electrical power to the light producing medium include such things as electrical resistance within the leads leading to a filament, the power loss within the ballast of a fluorescent lamp and so forth. The second power loss component is the portion of the electrical power actually delivered to the light producing medium which does not emerge from the lamp in the form of usable (visible spectrum) light. One of the primary contributors to this form of loss in incandescent and gas discharge lamps is heat generation within the lamp itself.

One adverse effect of power losses, both within the electrical portion of the system and within the light producing portion of the system, is the accompanying generation of heat which must be carried away from the lamp and its fixture in a safe, reliable manner. This is particularly a problem with gas discharge lamps which operate at a high temperatures. Further, the heat generated by a gas discharge lamp can have adverse effects on semiconductor devices used in the lamp ballast which produces the high frequency signal needed to sustain the arc discharge within the lamp.

In the past, lamps, including their fixtures and their bulbs, have generally been relatively large with the result that the size of the ballast which excites a fluorescent or other discharge lamp has not been a major concern in lamp designs because the physical dimensions of the ballast were normally substantially smaller than the fixture dimensions which were required merely by the size of the bulb or because the ballast was easily incorporated into the base of a desk or floor lamp.

The electrodeless, high-intensity-discharge (H.I.D.) lamp was developed in an attempt to increase bulb life and light output to thereby reduce life cycle costs for lighting systems. Lamps of this general type are disclosed in U.S. Pat. Nos. 3,500,118 and 4,180,763, both issued to J. M. Anderson and in U.S. patent application Ser. No. 134,498, filed Dec. 17, 1987, by Sayed-Amr El-Hamamsy et al. Such lamps have the potential to operate almost indefinitely with their original bulb, since the bulb contains no electrodes which can deteriorate, relies on an arc discharge within a gas contained within its envelope for its light emission and uses an externally applied, localized, radio frequency signal to create and sustain that arc discharge. Such lamps may be generally toroidal in the sense of comprising a doughnut-like continuous, hollow, annular tube which contains the gas in which their arc discharge forms. Such generally toroidal lamps may be circular, elongated or other desired shapes. Other electrodeless, high-intensity-discharge lamps may employ a generally spherical, ellipsoidal or elongate hollow envelop disposed within an excitation coil to contain their arc discharge gas.

Electrodeless, high-intensity-discharge lamps require a high frequency ballast to convert ac power line frequencies to the radio frequencies which are necessary to induce an arc discharge in the gaseous medium disposed within the lamp envelope. Because the system power is large (300 W or more) a lot of power is dissipated even at efficiencies of up to 90%. Most of this power is dissipated in the switching devices, which therefore require efficient heat sinking. Proper heat sinking of the switching devices protects the junctions of these devices from excessive temperature rises. Excessive temperature rises have two main deleterious effects. The first is that as the junction temperature rises, so does the on resistance of the device. This increased on resistance increases the power losses. The second deleterious effect is that if the devices run too hot, their life is significantly reduced.

In order to minimize life cycle costs for lighting systems, there is a need for high efficiency lamp ballasts for exciting discharge lamps of all kinds. This need is especially significant with electrodeless, high-intensity-discharge lamps whose enormous bulb life makes power costs a more significant component of the life cycle costs than is the case with lamps which require frequent, or at least more frequent bulb replacement.

Electrodeless, high-intensity-discharge lamps of the type having a generally ellipsoidal gas containing envelope may have a lamp envelope which is substantially smaller than typical prior art ballast systems. With such small lamp envelopes, it becomes desirable to place the ballast in close proximity to the bulb's envelope in order to provide a compact fixture. More important from an efficiency point of view is the need to minimize the length of the leads from the ballast to the drive coil, since the relatively large RF currents flowing in these leads can cause substantial resistive losses. Where the ballast of such a lamp includes semiconductor devices or other particularly heat sensitive components, a desire to place the ballast close to the lamp for compactness reasons must be weighed against the adverse effect of exposing the ballast, and particularly its semiconductor devices, to the higher temperatures which result from placing the ballast close to the bulb.

Accordingly, there is a need for compact, high efficiency ballast systems for excitation of electrodeless, high-intensity-discharge lamps whose efficiency and useful life are not adversely affected by being disposed in close proximity to a high temperature gas discharge lamp envelope.

OBJECTS OF THE INVENTION

Accordingly, a primary object of the present invention is to provide a high efficiency, compact lamp ballast suitable for use in exciting an electrodeless, high-intensity-discharge lamp.

Another object of the present invention is to provide a high efficiency, semiconductor based, lamp ballast which has a long lifetime when disposed in close proximity to a high temperature, electrodeless, discharge lamp.

Another object of the present invention is to provide a physical configuration for such a lamp ballast which enhances power efficiency while providing a compact structure.

SUMMARY OF THE INVENTION

The above and other objects which will become apparent from the specification as a whole, including the drawings, are achieved in accordance with one embodiment of the present invention by configuring a lamp ballast with separate input and output circuit boards which are disposed substantially parallel and spaced apart in a direction perpendicular to their major surfaces. The package containing the switching devices which produce the high power, radio frequency signal which excites the electrodeless, high-intensity-discharge lamp extends between the circuit boards and is disposed in thermal contact with a heat sink for carrying away the power which the switching devices dissipate. The drive transformer system which couples the switching control signals to the switching devices, is disposed between the circuit boards with the switching device package between it and the heat sink. This drive transformer is preferably enclosed by ground planes on four sides with the ground plane for two of those sides being disposed on the circuit boards and the ground planes for the other two sides extending between the circuit boards. The heat sink substantially serves as a fifth side of the enclosure. The open side of this enclosure is preferably oriented toward the lamp envelope and the coil which drives the lamp.

This ballast configuration, when used with the drive circuit and package of the related applications, can provide an overall ballast electrical efficiency in excess of 90% for frequencies in the RF range.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIGS. 2 and 3 respectively illustrate first and second sides of an early version of a printed-circuit-board-mounted drive system for an electrodeless, high-intensity-discharge lamp;

FIG. 8 illustrates a lamp ballast constructed in accordance with the present invention in elevation with an outer shield removed;

FIG. 9 illustrates the ballast of FIG. 8 elevation with the shield in place;

FIGS. 10 and 11 respectively illustrate first and second sides of one circuit board of the ballast of FIG. 8;

FIGS. 12 and 13 respectively illustrate first and second sides of a second circuit board of the ballast of FIG. 8;

FIGS. 14 and 15 illustrate, respectively, elevation and plan views of an overall ballast configuration in accordance with the present invention.

DETAILED DESCRIPTION

Figure 1:
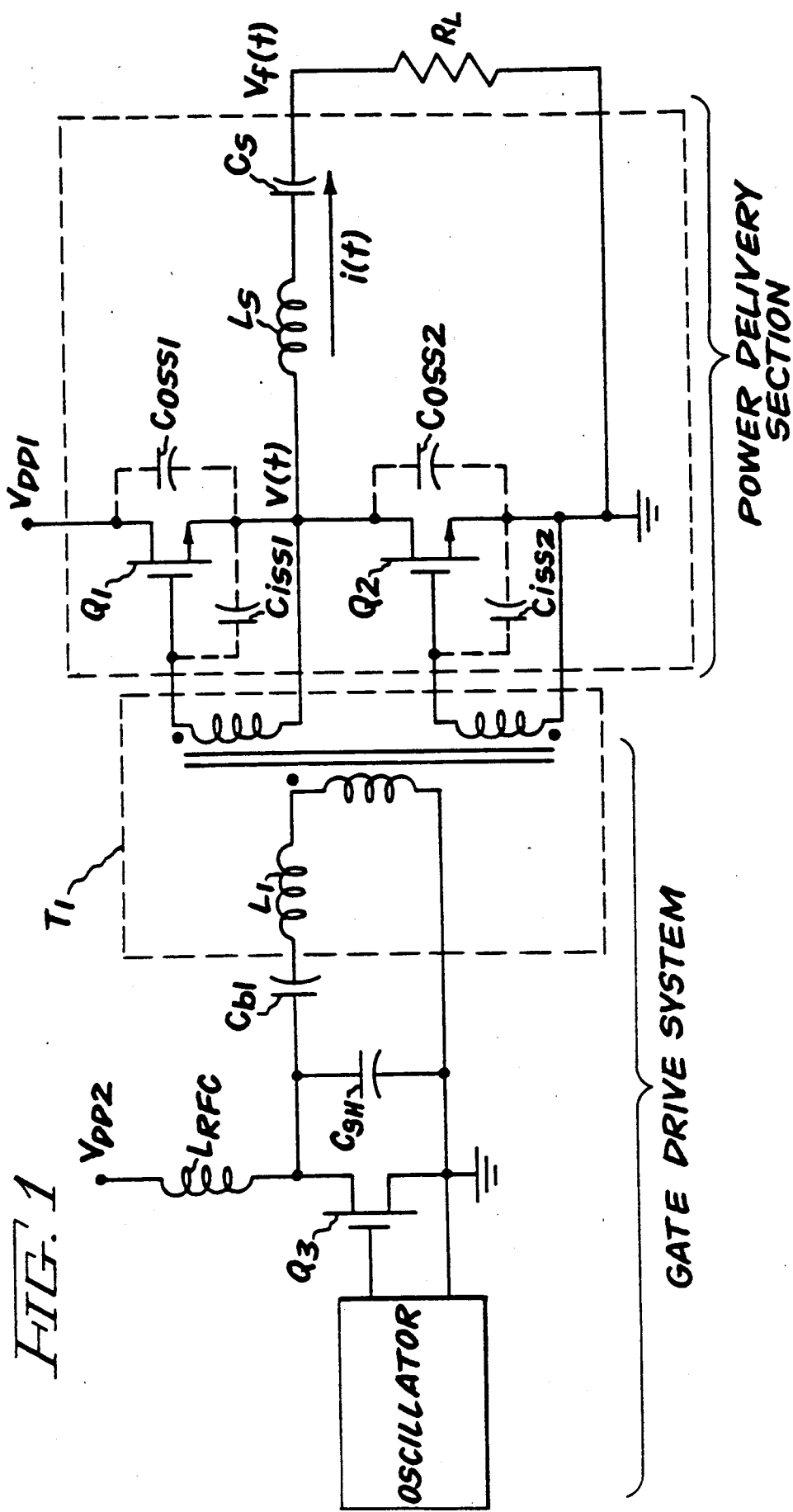
FIG. 1 is a circuit diagram of a lamp ballast circuit in accordance with related application Ser. No. 454,614.

An overall circuit diagram of a lamp ballast for an electrodeless, high-intensity-discharge lamp is illustrated in FIG. 1. The related application Ser. No. 454,614 is directed to this circuit. This ballast comprises a gate drive section or system in the lefthand portion of FIG. 1 and a power delivery section in the righthand portion of FIG. 1.

The power delivery section is illustrated as comprising a conventional voltage-switching Class-D power amplifier 10. Two power switching devices $Q_1$ and $Q_2$ are connected in series with a dc power supply $V_{DD1}$ in a half-bridge configuration. Switching devices $Q_1$ and $Q_2$ are illustrated as MOSFET's, but other types of switching devices having capacitive gates may be used, such as insulated gate bipolar transistors (IGBT's) or MOS-controlled thyristors (MCT's). Each switching device $Q_1$ and $Q_2$ includes an output parasitic capacitance $C_{oss1}$ and $C_{oss2}$ (shown in dashed lines), respectively, and an input parasitic capacitance $C_{iss1}$ and $C_{iss2}$ (also shown in dashed lines), respectively. A load network comprising a series resonant circuit, including an inductor $L_S$ and a capacitor $C_S$, and a load resistance $R_L$, is connected to the half-bridge at the junction between devices $Q_1$ and $Q_2$. The gate drive system is illustrated as comprising a Class-E power amplifier which is coupled to the gates of MOSFET's $Q_1$ and $Q_2$ by an isolation transformer $T_1$. As shown, the Class-E power amplifier employs a single driver switching device $Q_3$ connected in series with a dc power supply $V_{DD2}$. Like switching devices $Q_1$ and $Q_2$, switching device $Q_3$ may comprise a MOSFET. A series resonant circuit, which is coupled to the drain of device $Q_3$, comprises an inductance $L_1$ and a capacitance connected to a load, i.e., the Class-D power amplifier. Preferably, the inductance $L_1$ comprises the leakage inductance of isolation transformer $T_1$ which couples the gate drive system to the Class-D power amplifier. By so using the parasitic inductance, driver size can be decreased, while efficiency is increased. The capacitance of the series resonant circuit comprises the series combination of a blocking capacitance $C_{b1}$ and the capacitance due to the combination of input parasitic capacitances $C_{iss1}$ and $C_{iss2}$ reflected to the primary of transformer $T_1$. Blocking capacitance $C_{b1}$ is provided to prevent saturation of transformer $T_1$ by blocking application of dc voltage thereto. Since blocking capacitance $C_{b1}$ is typically large compared with the reflected capacitance due to the combination of capacitances $C_{iss1}$ and $C_{iss2}$, the capacitance of the series resonant circuit is effectively equal to the reflected capacitance of the combination of parasitic capacitances $C_{iss1}$ and $C_{iss2}$. The Class-E driver circuit further comprises an RF choke $L_{RFC}$ to ensure that the drain current of device $Q_3$ remains substantially constant. A capacitance $C_{SH}$, which preferably comprises at least a portion of the output parasitic capacitance of device $Q_3$, is employed to shunt the switching device $Q_3$. The driver switching device $Q_3$ is driven by an oscillator 18 that generates a sinewave power signal at a high frequency.

As is explained in application Ser. No. 454,614, proper operation of the circuit of FIG. 1 is dependent on the proper timing of the switching of transistors $Q_1$ and $Q_2$. This, in turn, is dependent on maintaining the drive signals to the gates of $Q_1$ and $Q_2$ at their desired 180° out-of-phase relationship with equal amplitudes. In order to obtain a high overall power efficiency with this circuit (the power actually delivered to the load divided by the total input power) switching losses and the dissipation of power within the circuit as a result of parasitic resonances and other loss mechanisms must be minimized. As a consequence, in fabricating this circuit, the actual physical components employed must be carefully selected and the manner of their physical interconnection and placement must be carefully designed in order to minimize losses due to (1) charging of stray capacitances, (2) parasitic inductance dependent current waveform distortion, (3) radiation of electromagnetic waves (electromagnetic interference (EMI) and (4) other loss mechanisms which consume power which might otherwise be delivered to the load.

It is desired to operate the lamp ballast of FIG. 1 at 13.56 MHz which is within the industrial, scientific and medical band of the electromagnetic spectrum in which moderate amounts of electromagnetic radiation are permissible. For proper operation of the electrodeless, high-intensity-discharge lamp, it is desired to deliver 300 watts of RF power to the bulb (lamp envelope) in order to generate the desired light output. In order to minimize overall power consumption and thereby minimize system life cycle costs, it is desirable to deliver this 300 watts of power to the lamp envelope with an efficiency of at least 85%. The overall ballast efficiency is comprised of the efficiency of the front end AC to DC converter and the efficiency of the RF section. The overall efficiency goal of 85% was divided between these sections on a front end power supply 95% efficient, RF section 90% efficient for an overall efficiency of 85.5%. At 85% efficiency, 353 watts of line power must be delivered to the lamp fixture in order to deliver 300 watts to the bulb itself.

As is explained in related application Ser. No. 454,550, we initially found the power efficiency of this system to be severely limited by the manner in which the switching devices were packaged and thus connected within the circuit. The package which is disclosed and claimed in application Ser. No. 454,550 provided a major benefit in the overall physical construction of the lamp ballast of FIG. 1 by minimizing packaged device inductance in the actual circuit and facilitating ballast layout in a minimum parasitic inductance manner.

An early configuration for this system using the application Ser. No. 454,550 package is illustrated in FIGS. 2 and 3 which illustrate opposite surfaces of a printed circuit board and the attachment of components thereto. In building still earlier versions of this circuit, we found that current waveforms were distorted as a result of feedback between the output circuit and the gate drive circuits. This limited overall system power efficiency in an undesirable manner. Consequently, in the version shown in FIGS. 2 and 3, we chose to use a two sided circuit board with the dc power input and gate control circuitry disposed on a first surface thereof and with the output conductors disposed on a second surface thereof in order to avoid feedback from the output circuit to the gate drive circuit.

In FIG. 2 the first surface 20 of the circuit board is illustrated in plan view. To the left of the center of the board, an aperture or hole 19 has been cut in the circuit board in order to facilitate mounting of the package (which is described more fully in related application Ser. No. 454,550 to conductors on both sides of the circuit board in an effective manner. A wedge-shaped printed conductor 21 which serves as the positive dc supply voltage conductor is disposed near the left side of the board in FIG. 2. Most of the rest of the exposed surface of side 20 of the circuit board is covered by a ground conductor or ground plane 23 which extends from just below the power conductor 21 across the bottom of the board (below the aperture) to the board's right side and back across the top of the board (above the aperture) to the top lefthand portion of the board. Two separate printed conductor runs 24 and 25 are disposed on the surface 20 of the circuit board just below the aperture 19. A similar set of conductors 26 and 27 is disposed just above the aperture 19. Each pair of these conductors serves to connect the gate circuit of one of the switching devices $Q_1$ and $Q_2$ to its corresponding drive circuit in a manner to be described subsequently.

The device package 159 comprises a ceramic substrate 160 having first, second and third power conductors 161, 162 and 163, respectively, disposed on the surface thereof. Also disposed thereon are four gate circuit conductors 164, 165, 166 and 167. Each of these conductors is preferably copper, which is direct bonded to the substrate 60 and which extends beyond the lateral edges of the substrate 160. Each of the switching devices Q₁ and Q₂ has its back surface (drain terminal) soldered to its associated conductor 161 or 162. The source terminals of these devices are connected to the conductors 162 and 163, respectively, by multiple wire bonds or by a wide, flat strap to minimize inductance while providing appropriate current carrying capacity. The gate terminals of the two devices are connected by wire bonds respectively to the conductors 165 and 167. The conductors 164 and 166 are connected by wire bonds to the source terminals of transistors Q₁ and Q₂, respectively. In this manner, the conductors 24 and 25 and 26 and 27 provide a Kelvin connection of the gate circuit to the source terminal of the respective associated devices to minimize feedback effects between the power portion of the circuit and the control portion of the circuit.

While the circuit in FIG. 1 illustrates a single transformer T₁ as providing the drive signals to the transistors Q₁ and Q₂, two separate drive transformer segments 171 and 172 are provided in this assembly with their primaries connected in series. We found it desirable to use separate drive transformer segments to minimize the interaction between the secondary windings of these two transformers in order to minimize current waveform distortion. Since these two transformers are made substantially identical and are connected in series, the effect is similar to having a single transformer other than the very low level of mutual coupling between the secondary windings which is provided by the use of separate magnetic cores for the two transformers in combination with the physical spacing of the secondary windings from each other. This has been found beneficial in achieving the desired close control over the relative phase and amplitude of the gate drive signals and the avoidance of distortions in the desired sinusoidal waveforms.

In FIG. 3, the opposite side, 30, of the circuit board is illustrated in plan view. A major portion of the exposed surface of this side of the circuit board is covered by a ground conductor 33 which has a generally elongated "C" shape. To the right of the aperture 19, an output conductor 32 extends from the package lead 162 to the series capacitor C$_s$ of the output circuit which is connected between the conductor 32 and a conductor 39. A preferably copper conductor 168 is disposed on the surface of the package substrate 160 which is visible in this Figure. That conductor is preferably direct bonded to the substrate 160 as is discussed in application Ser. No. 454,550.

This somewhat complex circuit board and component arrangement resulted from the need to isolate the gate drive circuit from the output circuit. A further complication resulted from the need to provide a heat sink in direct thermal contact with the conductor 168 on the bottom of the package 159 to keep the semiconductor switching devices Q₁ and Q₂ cool. To facilitate contact to a heat sink, the package lead 162 was retained in a straight, flat configuration and soldered to conductor 32 and the other package leads 161, 163-167 were bent toward the surface 20 of the circuit board and then bent to lie flat on that surface 20 and soldered to their corresponding circuit board conductors 21 and 23-27, respectively. This raised the conductor 168 from the surface 30 of the circuit board by the thickness of the substrate 160 which is typically 25 mils (635 microns). The physical outline of a heat sink 40 for the device package is indicated by the dashed line 40. The placement of the heat sink 40 directly against the conductor 168 resulted in minimum clearance between the heat sink and the output conductor 32. Further, it required the use of a longer than desired output conductor 32 in order to provide clearance for the mounting of the series capacitor C$_s$ between the conductor 32 and the conductor 39. This resulted in higher than desired inductance in the output circuit. Because of problems with the heat sink shorting the conductor 32 to ground, it was found necessary to mount a brass riser block on the heat sink. This brass riser block was placed in direct contact with the conductor 168 and served to space the bulk of the heat sink further from the surface 30 of the circuit board. This was found to be disadvantageous because of an increased thermal resistance between the package and the bulk of the heat sink and a resulting higher operating temperature for the switching devices. This resulted in an undesirable degradation of both the electrical and thermal characteristics of the system.

Figure 4:
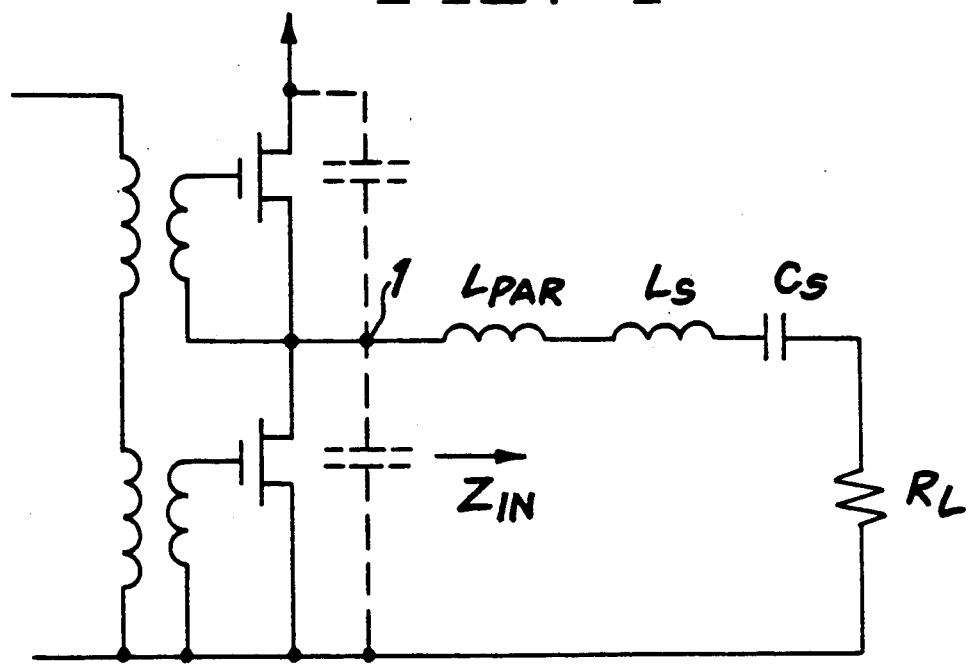
FIG. 4 illustrates an equivalent circuit for the FIGS. 2 and 3 structure when driving a resistive load.
Figure 5:
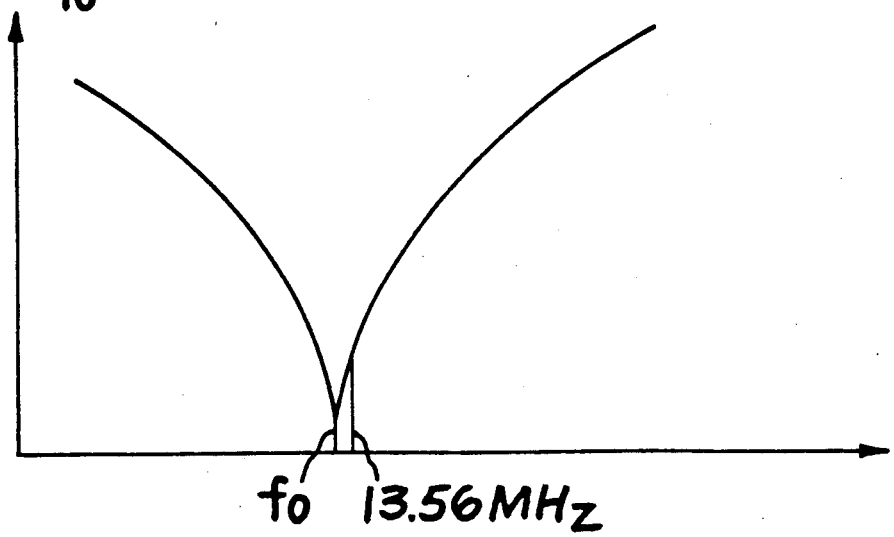
FIG. 5 illustrates the load impedance seen by the drive system in FIG. 4 as a function of frequency.

With this packaging configuration, the RF section of the lamp ballast operated at efficiencies of 87%. This fell short of our 90% efficiency goal for the RF section. We found that even with the low inductance device package 159 of application Ser. No. 454,550, the long conductor 32 in combination with that package produces a parasitic inductance between the switching devices Q₁ and Q₂ and the intentional series inductances L$_s$ of the FIG. 1 circuit. The equivalent circuit for this ballast is illustrated in FIG. 4. In the FIG. 4 circuit, the parasitic inductance L$_{par}$ together with the physical inductor L$_s$ combines to comprise simply a slightly large inductor having the value (L$_{par}$+L$_s$). Consequently, the value of the physical inductor can be adjusted to provide the desired actual inductance in the output circuit. The load impedance seen at the terminal 1 in the circuit diagram of FIG. 4 is illustrated in FIG. 5 as a function of frequency. The resonant frequency f₀ of this circuit is equal to $$f_0 = \frac{1}{\sqrt{(L_s + L_{par})C_s}} \quad (1)$$

Figure 6:
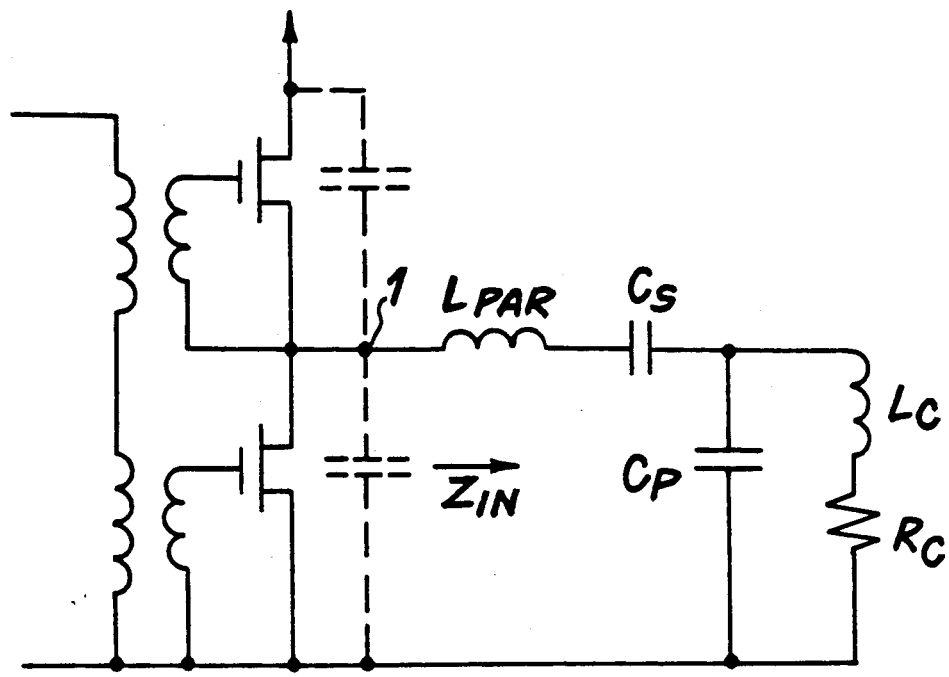
FIG. 6 illustrates an equivalent circuit for the FIGS. 2 and 3 structure when driving a drive coil for an electrodeless, high-intensity-discharge lamp.
Figure 7:
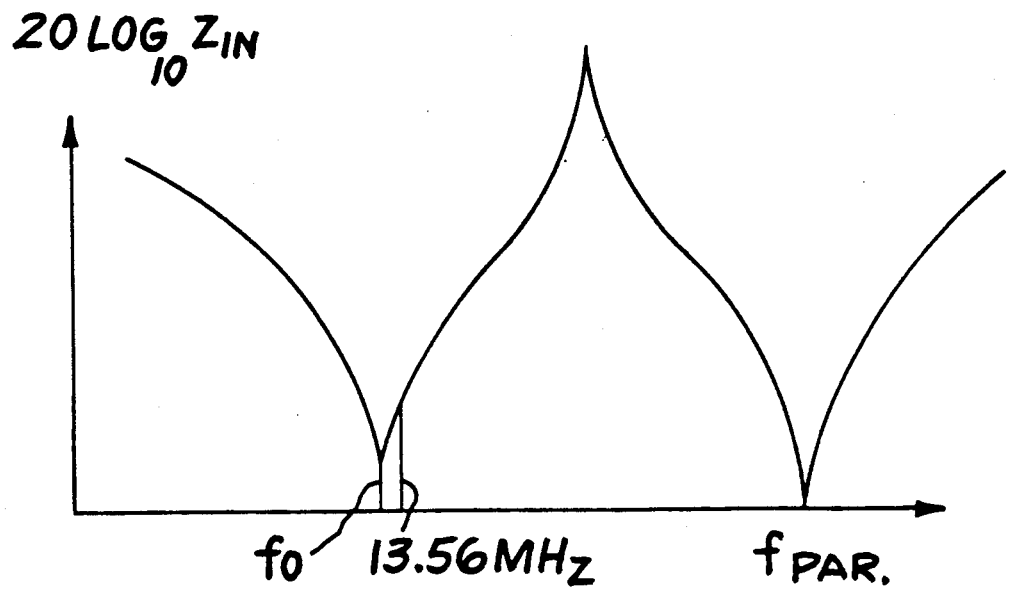
FIG. 7 illustrates the load impedance seen by the drive system of FIG. 6 as a function of frequency.

Thus, if the actual load circuit had the configuration illustrated in FIG. 4, this parasitic inductance would not be a problem. However, in actuality, the load circuit has the equivalent circuit shown in FIG. 6. Consequently, the parasitic inductance introduces a second resonance into the load circuit and can distort the signal waveforms. This waveform distortion causes dissipation of undesired amounts of power in the drive circuit. In particular, the circuit shown in FIG. 6 exhibits the load impedance as a function of frequency which is illustrated in FIG. 7. The lower resonant frequency f₀ is $$f_0 = \frac{1}{\sqrt{C_s \left( \frac{L_c}{1 - \frac{f_0^2}{f_p^2}} \right)}} \quad (2)$$

and the upper resonant frequency f$_{par}$ is $$f_{par} = \frac{1}{\sqrt{L_{par}\left(\frac{C_s C_p}{C_s + C_p}\right)}} \quad (3)$$

This second resonance introduces waveform distortion and increases power dissipation, thereby reducing overall power efficiency.

In order to overcome the problems encountered with the construction of the circuit illustrated in FIGS. 2 and 3, we have developed the system configuration 100 illustrated in FIGS. 8-15.

In FIG. 8, the system is illustrated in an elevation view with a shield removed. At the left most part of the figure is the heat sink 140 for the device package 159. The back conductor 168 on the back surface of the substrate 160 is disposed in direct contact with the heat sink 140. The power input conductors 161 and 163 of the package are disposed at the upper end of the substrate in FIG. 8 and are soldered to conductors on a first circuit board 120 to be discussed in more detail subsequently. The output conductor 162 of the package is disposed downward in the figure and bonded to a conductor on a second circuit board 130 to be discussed subsequently.

The circuit boards 120 and 130 are spaced apart by posts 104 which are secured to the circuit boards and upper and lower brackets 102 by screws, bolts or other appropriate means. The brackets 102 are generally L-shaped in order that support and adjustment screws 142 for the heat sink 140 may secure the brackets and thus the circuit boards and the switching device package in the desired fixed relation with respect to the heat sink 140. The gate drive transformers 171 and 172 are disposed between the circuit boards with only the gate drive transformer 171 being visible in FIG. 8. These transformers may be secured by mounting hardware or by gluing them to the circuit board. The gate drive transformers preferably include a ferrite of other magnetic core in the form of a rectangular toroid and are wound with coaxial cable. In a preferred configuration, these transformers each have four turns of the coaxial cable wound thereon. The inner conductor of this coaxial cable is continuous to provide a four turn primary winding, while the outer conductor or shield of the coaxial cable has its four turns connected in parallel to form a single turn secondary winding having greater current carrying capacity than the primary winding. In this configuration, the primary to secondary coupling is provided directly by the coaxial configuration of the conductors. The ferrite or other magnetic material serves primarily to increase the magnetizing inductance of the transformer to provide a relatively high input impedance to avoid loading the gate drive circuit with an essentially short circuit which would draw excessive currents.

In FIG. 9, a side elevation view of the assembly 100 is shown. Most of the structure in FIG. 9 is already illustrated in FIG. 8, however, a shielding conductor 106 is only visible in FIG. 9. Conductor 106 connects the ground plane on the upper circuit board 120 to the ground plane on the lower circuit board 130 and together with a similar conductor at the opposite sides of the circuit board serves to provide a shielding enclosure for the drive transformers which minimizes interference and feedback from the output circuit to the gate drive circuit.

The first circuit board 120 is illustrated in FIGS. 10 and 11. In FIG. 10, the outer surface (the upward surface in FIGS. 8 and 9) of the circuit board 120 is illustrated in plan view. This surface of the circuit board has a dc power conductor 121 extending the horizontal length of the circuit board and spaced from the upper and lower edges in FIG. 10 which are the front and back edges of the circuit board in the orientation illustrated in FIG. 8. A two piece ground conductor 123 is disposed above and below the conductor 121. The back or inside surface of the circuit board 120 (illustrated in FIG. 11) is a single, continuous ground conductor 123. The location of holes for the screws which attach to the brackets 102 to the circuit board and the posts 104 are shown in both of these illustrations. The conductors 123 on the opposite sides of the circuit board are preferably connected together by metal foil wrapped across the edge of the circuit board and soldered to the ground conductors on both surfaces. This is considered preferable to relying on the brackets and posts and their fasteners to provide this ground connection both because of the high frequencies at which the circuit is operated and because of a desire to be able to use bracket materials such as aluminum which may form an insulating oxide on the surface thereof.

The lower circuit board 130 of FIG. 8 is illustrated in front and back plan views in FIGS. 12 and 13. The outer (downward in FIG. 8) surface of the circuit board 130 is illustrated in FIG. 12 where an output conductor 132 extends from side to side of the circuit board in the central portion thereof. Two ground conductors 133 are disposed above and below that conductor and also extend the full horizontal width of the circuit board. As illustrated in FIG. 13, the back or inward surface of the circuit board 130 is covered by a ground conductor 133. Here again, the holes for the screws which attach the brackets 102 to the circuit board and the posts 104 are illustrated. The ground conductors on opposite sides of the circuit board are also preferably connected together by conductive foil wrapped across the edges of the circuit board.

While the connection of the ground conductor on one side of a circuit board to the ground conductor on the opposite side has been described in terms of the use of a soldered metal foil, it will be understood that these circuit boards could be fabricated with the ground planes of each board formed of a single continuous metal foil having a first edge disposed on the outside surface of the board's dielectric support layer with the foil being wrapped from that location on the outer surface of the board, across its upper edge, down across its entire inner surface, down around and over its lower edge and back up onto its outer surface. The second edge of this foil may be positioned to leave space for a separately applied non-ground conductor (121 or 132) or may be brought to the location of the upper edge of that conductor. In the latter case, the gap which separates the lower edge of the non-ground conductor from the ground conductor is formed separately by normal circuit board fabrication techniques. Fabrication of the circuit board with the ground conductor continuous across both sides of the circuit board is facilitated by the relatively simple conductor configuration on the board in which the conductor pattern is uniform in the horizontal direction in the Figures. With this manner of forming the circuit board, a plurality of circuit boards may be formed as a single, long, continuous circuit board strip which is subsequently cut into separate circuit boards.

As mounted in FIGS. 8 and 9, the ground conductors 123 and 133 on the back or inside surfaces of the circuit boards are disposed toward each other and in combination with the conductors 106, surround the drive transformers 171 and 172 on four sides. The heat sink 140 provides a fifth side to the enclosure of the drive transformers, although there is a gap between the heat sink 140 and the edge of the conductor 106. This gap facilitates air circulation around the transformers for cooling. However, this gap can be lessened if increased electromagnetic shielding is desired at that position.

A desirable overall configuration for the lamp ballast structure in accordance with the present invention is illustrated in FIG. 14 in a top plan view and in FIG. 15 in a side elevation view. The series capacitor $C_s$ of FIG. 6 is embodied in this structure as the conducting plates 181 and 183 which are spaced apart by a dielectric layer 182 to form a capacitor 184. The conductor 183 extends to the coil 88 and serves as a first plate of the parallel capacitor $C_p$ which is identified by the reference numeral 187 and which further comprises a dielectric layer 185 and a second conductor 186. The conductor 186 is connected to the ground plane on the circuit board 130 by a conductor 189. The generally spherical or ellipsoidal electrodeless, high-intensity-discharge lamp envelope 195 is disposed within the coil 188 for excitation by the radio frequency signal applied thereto.

The lamp ballast configuration illustrated in FIGS. 8-15 provides a compact, electrically and thermally efficient structure which minimizes power dissipation and thereby maximizes overall system efficiency. It will be noted that the switching devices $Q_1$ and $Q_2$ within the package are spaced as far as possible (for the size of the ballast) from the lamp envelope 195 which operates at an internal temperature in the vicinity of 5000° C. and may have an external surface temperature as high as 1000° C. Two heat sinks 190 and 192 serve to dissipate most of the heat which is transmitted from the lamp envelope 195 and/or conducted from the drive coil 188 to the plates of the parallel capacitor 187. This minimizes heat transmission from the lamp envelope 195 and coil 188 to the semiconductor switching devices to minimize switching device heating by the circuit load. Switching device heating is further minimized by heat sink 140 which serves to efficiently dissipate heat generated by the switching devices themselves. Thus, this lamp ballast configuration avoids trade-offs between electrical and thermal characteristics of the system by maximizing the efficiency of the system both thermally and electrically.

Test version of this RF ballast are about ⅓ the size of prior art production ballasts for high intensity discharge lamps and weigh between 1/10 and 1/5 of what those prior art production ballasts weigh. This entire structure may be mounted in a lamp fixture to provide a compact, high output, long life lamp. Since most high intensity lamp fixtures are designed to provide essentially hemispherical or smaller illumination patterns, an optical reflector may preferably be mounted between the heat sinks 190 and 192 and the lamp envelope 195 to reflect light (and heat) to the right in FIGS. 14 and 15.

A significant advantage of this lamp ballast configuration is the fact that it can be operated efficiently and safely without mechanical cooling at a room temperature ambient temperature, while providing 300 watts of RF power to the lamp envelope 195. With this structure using devices packaged in the package 159 of application Ser. No. 454,550 but which were not potted in plastic, this ballast system has operated with efficiencies as high as 91% at 13.56 MHz when driving a high intensity discharge lamp and as high as 97% at 1 MHz when driving a resistive load. Higher efficiencies can be obtained at 13.56 MHz by providing a larger heat sink 140 to cool the switching devices $Q_1$ and $Q_2$. At 91% efficiency, the RF section of this lamp ballast slightly exceeds it stated goal of 90% efficiency at 13.56 MHz. It will be understood that these efficiencies are in terms of the delivery of power to the high-intensity-discharge bulb and not in terms of electrical-power-in to light-power-out. It becomes more difficult to initiate and sustain the lamp discharge as the frequency decreases from the vicinity of 13.56 MHz.

In all of the power efficiency tests discussed in this specification, the oscillator and drive circuitry for the switching devices $Q_1$ and $Q_2$ were physically separate from the rest of the ballast and connected to the input of the gate transformers by a coaxial cable. The oscillator may be fabricated on or mounted on the circuit board 120 in order to provide the entire lamp ballast structure in a single, compact enclosure. Alternatively, a third circuit board may be used and mounted in place of the conductor 106 in FIG. 9. The line voltage to dc power converter for providing the 75 volts of dc power to the power conductor 121 is preferably separately fabricated and mounted within the overall lamp fixture.

Accordingly, this ballast configuration successfully achieves its objectives of providing a high efficiency, minimal feedback and distortion physical configuration for the lamp drive circuit of application Ser. No. 454,614 utilizing the device package of application Ser. No. 454,550.

While various connections within the ballast have been described as being solder connections, it will be understood, that any electrically acceptable means of forming these electrical connections may be used.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A lamp ballast for exciting a gas containing lamp comprising:
   first and second circuit boards, each having first and second major surfaces;
   first and second packaged semiconductor switching devices;
   a heat sink;
   a drive transformer system including first and second control signal outputs;
   a power supply input connection;
   said first and second circuit boards having their first major surfaces disposed substantially parallel and spaced apart in a direction perpendicular thereto;
   the device package having a first major surface and extending from a connection to a first conductor on said first major surface of said first circuit board to a connection to a second conductor on said first major surface of said second circuit board;
   said heat sink having a portion extending generally parallel to the plane of said first major surface of said package which is disposed in thermal contact with said package; and said drive transformer system being disposed between said circuit boards with said device package disposed intermediate said transformer and said heat sink.

2. The lamp ballast recited in claim 1 wherein:

said power supply input connection is coupled to said first circuit board;

said first circuit board includes power supply conductors for coupling said power supply connection to said switching devices; and said second circuit board includes conductors for coupling said switching devices to said lamp.

3. The lamp ballast recited in claim 2 wherein:

said ballast further comprises bypass capacitors connected across said power supply conductors of said first circuit board for minimizing RF signals induced by said lamp ballast on a power supply connected to said power supply input connection.

4. The lamp ballast recited in claim 1 wherein:

said drive transformer system comprises two spaced apart substantially electrically identical transformer segments each having a primary winding and a secondary winding.

5. The lamp ballast recited in claim 4 wherein:

the primary windings of said two segments are connected in series.

6. The lamp ballast recited in claim 5 wherein:

each of said transformer segments has a separate magnetic core.

7. The lamp ballast recited in claim 1 wherein:

each of said circuit boards has a ground plane disposed on the second surface thereof; and said ballast further comprises conductive material electrically continuous with said ground planes of said first and second circuit boards for, in combination with said ground planes, substantially enclosing the space between said circuit boards on at least four sides.

8. The lamp ballast recited in claim 7 wherein:

said second surfaces of said circuit boards are disposed toward each other.

9. The lamp ballast recited in claim 8 wherein:

said power supply input connection is coupled to said first circuit board;

said first circuit board includes power supply conductors for coupling said power supply connection to said switching devices; and said ballast further comprises bypass capacitors connected across said power supply conductors of said first circuit board for minimizing RF signals induced on the power supply by said lamp ballast.

10. The lamp ballast recited in claim 1 wherein:

said first and second switching devices are disposed in a common package.

11. The lamp ballast recited in claim 10 further comprising:

means for supporting said circuit boards and said heat sink in fixed relation to each other with said device package disposed in substantially direct thermal contact with said heat sink.

12. The lamp ballast recited in claim 1 wherein:

said drive transformer system comprises two spaced apart substantially electrically identical transformer segments each having a primary winding and a secondary winding.

13. The lamp ballast recited in claim 12 wherein:

the primary windings of said two segments are connected in series.

14. The lamp ballast recited in claim 13 wherein:

each of said transformer segments has a separate magnetic core.

* * * * *